US009447931B2

(12) United States Patent
Roberge et al.

(10) Patent No.: US 9,447,931 B2
(45) Date of Patent: Sep. 20, 2016

(54) LED-BASED LIGHTING UNIT WITH OPTICAL COMPONENT FOR MIXING LIGHT OUTPUT FROM A PLURALITY OF LEDS

(75) Inventors: Brian Roberge, Franklin, MA (US); Eric Anthony Roth, Tyngsboro, MA (US); Dirk Fieberg, Groton, MA (US); Joseph Henri Aubin, Goffstown, NH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 150 days.

(21) Appl. No.: 14/127,300

(22) PCT Filed: Jun. 19, 2012

(86) PCT No.: PCT/IB2012/053081
§ 371 (c)(1),
(2), (4) Date: Dec. 18, 2013

(87) PCT Pub. No.: WO2012/176117
PCT Pub. Date: Dec. 27, 2012

(65) Prior Publication Data
US 2014/0204586 A1   Jul. 24, 2014

Related U.S. Application Data

(60) Provisional application No. 61/500,975, filed on Jun. 24, 2011.

(51) Int. Cl.
*F21V 7/04* (2006.01)
*F21K 99/00* (2016.01)
(Continued)

(52) U.S. Cl.
CPC ............... *F21K 9/54* (2013.01); *F21S 10/023* (2013.01); *F21V 7/0033* (2013.01); *F21V 7/041* (2013.01); *G02B 19/0028* (2013.01); *G02B 19/0061* (2013.01); *F21V 29/80* (2015.01);
(Continued)

(58) Field of Classification Search
CPC ......... F21V 7/041; F21K 9/54; F21S 10/023
USPC ........................... 362/294, 373, 249.02, 235
See application file for complete search history.

(56) References Cited

U.S. PATENT DOCUMENTS 3,263,070 A * 7/1966 Hine ..................... F21V 14/00
352/198
5,924,788 A * 7/1999 Parkyn, Jr. ................ F21V 5/04
362/249.02

(Continued)

FOREIGN PATENT DOCUMENTS

EP            1466807 A1    10/2004
WO        2008050783 A1     5/2008

(Continued)

*Primary Examiner* — Anabel Ton

(57) ABSTRACT

Methods and apparatus related to an LED-based lighting unit (10, 110) having an optical component for mixing light output from a plurality of LEDs (34, 134). In some embodiments the optical component may include at least one reflective surface interiorly thereof and the LEDs (34, 134) may be vertically arranged about the reflective surface. At least some of the LEDs (34, 34) may generate a light output generally directed toward the reflective surface. The reflective surface may be configured to direct at least some of the light output directly incident thereon through a light output opening (25, 125) of the optical component.

24 Claims, 6 Drawing Sheets

(51) Int. Cl.
*G02B 19/00* (2006.01)
*F21V 7/00* (2006.01)
*F21S 10/02* (2006.01)
*F21W 131/406* (2006.01)
*F21Y 113/00* (2016.01)
*F21V 29/80* (2015.01)

(52) U.S. Cl.
CPC .... *F21W2131/406* (2013.01); *F21Y 2113/005* (2013.01); *G02B 2207/113* (2013.01)

(56) References Cited

U.S. PATENT DOCUMENTS

| | | | |
|---|---|---|---|
| 6,016,038 | A | 1/2000 | Mueller et al. |
| 6,183,100 | B1 | 2/2001 | Suckow et al. |
| 6,211,626 | B1 | 4/2001 | Iys et al. |
| 7,583,018 | B2 | 9/2009 | Fujino et al. |
| 7,722,211 | B2 | 5/2010 | Marra et al. |
| 7,922,355 | B1 | 4/2011 | Morejon et al. |
| 8,992,051 | B2 * | 3/2015 | Yang ............ F21K 9/1355 362/294 |
| 2010/0226127 | A1 | 9/2010 | Bigliatti et al. |
| 2012/0275165 | A1* | 11/2012 | Choi ............ F21K 9/00 362/294 |

FOREIGN PATENT DOCUMENTS

| | | |
|---|---|---|
| WO | 2009062053 A1 | 5/2009 |
| WO | WO2009062053 A1 | 5/2009 |
| WO | 2009138228 A1 | 11/2009 |

* cited by examiner

LED-BASED LIGHTING UNIT WITH OPTICAL COMPONENT FOR MIXING LIGHT OUTPUT FROM A PLURALITY OF LEDS

TECHNICAL FIELD

The present invention is directed generally to an LED-based lighting unit. More particularly, various inventive methods and apparatus disclosed herein relate to an LED-based lighting unit having an optical component for mixing light output from a plurality of LEDs.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

It has been proposed to utilize an LED light source in lieu of one or more incandescent light sources in various lighting fixtures such as, for example, lighting fixtures designed for theatrical and other entertainment applications. The LED light source in such lighting fixtures generally attempts to replicate the light output of the incandescent source.

However, such lighting fixtures utilizing a LED light source suffer from one or more drawbacks. For example, the LED lighting fixtures may employ LEDs of multiple colors and may be unable to obtain efficient mixing of the colors. Inefficient mixing of the colors may cause chromatic aberration or separation of the colors in the far field image, which may be further exacerbated when gobos or other effects are utilized. Miniature LED and Chip-on-Board arrays have reduced such an effect, but there is still a need for further mixing of the light output from the LEDS.

Thus, there is a need in the art to provide a LED-based lighting unit that provides satisfactory mixing of light output from a plurality of LEDs thereof, thereby providing minimization of chromatic aberration in the light output thereof.

SUMMARY

The present disclosure is directed to inventive methods and apparatus for an LED-based lighting unit having an optical component for mixing light output from a plurality of LEDs. For example, in some embodiments the optical component may include at least one reflective surface interiorly thereof and the LEDs may be vertically arranged about the reflective surface. At least some of the LEDs may generate a light output generally directed toward the reflective surface. The reflective surface may be configured to direct at least some of the light output directly incident thereon through a light output opening of the optical component.

Generally, in one aspect, an LED-based lighting unit includes a longitudinally extending lighting unit axis, a light output opening surrounding the lighting unit axis, and a reflector positioned above the light output opening and surrounding the lighting unit axis. A plurality of LEDs are also included and are positioned below the light output opening and surround the lighting unit axis. Each of the LEDs emits a light output having a light output central axis generally directed toward and perpendicular to the lighting unit axis. At least one reflective surface is interposed between at least some of the LEDs and the lighting unit axis. The reflective surface is positioned such that a plurality of the light output central axis are directly incident thereon and is configured such that a plurality of the light output central axis directly incident thereon are directed through the light output opening.

In some embodiments, the reflective surface is a reflective conical optical member having an apex most closely adjacent the light output opening. The apex may optionally be centered on the lighting unit axis. Also, the reflective surface may include a plurality of planar surfaces converging toward an apex optionally centered on the lighting unit axis. The LEDs may be arranged on a plurality of planar surfaces centered about the lighting unit axis.

In some embodiments, the reflective surface includes a plurality of pyramidal structures radially arranged about the lighting unit axis and each having an apex most closely adjacent the lighting unit axis.

Generally, in another aspect, a LED-based lighting unit is provided that includes a longitudinally extending lighting unit axis, a light output opening surrounding the lighting unit axis, and a light altering structure positioned above the light output opening and centered about the lighting unit axis. A plurality of LED PCBs are also provide and are positioned below the light output opening and surround the lighting unit axis. Each of the LED PCBs is substantially parallel to the lighting unit axis and has interiorly facing LEDs thereon emitting a light output having a light output central axis. A reflective conical optical member is provided interiorly of the LED PCBs and centered about the lighting unit axis. The conical optical member has a base and an apex. The apex is more proximal the light output opening than the base.

In some embodiments, an exterior surface of the conical optical member between the base and the apex is generally concave. The LED-based lighting unit may further include a plurality of support structures interposed between the LED PCBs. In some version of those embodiments at least an interior facing portion of each of the support structures is reflective.

In some embodiments, at least an interior facing portion of each of the LED PCBs is reflective. Also, the distance along the lighting unit axis between the base and the apex can be greater than the distance along the lighting unit axis between the apex and the light output opening. An odd number of the LED PCBs may optionally be asymmetrically arranged about the lighting unit axis.

In some embodiments the light altering structure is a reflector.

Generally, in another aspect, a LED-based lighting unit is provided that includes a longitudinally extending lighting unit axis, a light output opening surrounding the lighting unit axis, and a plurality of LED PCBs positioned below the light output opening and surrounding the lighting unit axis. Each of the LED PCBs is substantially parallel to the lighting unit axis and has interiorly facing LEDs thereon emitting a light output having a light output central axis. A plurality of reflective pyramidal structures are provided interiorly of the LED PCBs and radially arranged about the lighting unit axis. Each of the pyramidal structures has an apex most proximal the lighting unit axis and a base most distal the lighting unit axis. The base receives a majority of the light output from a single of the LED PCBs.

In some embodiments, an odd number of the pyramidal structures are provided.

In some embodiments, the pyramidal structures are each non-symmetrical and/or each include an elongated rectangular base.

The LED-based lighting unit may further include a horn-type reflector positioned above the light output opening and surrounding the lighting unit axis.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

It has been proposed to utilize an LED light source in lieu of one or more incandescent light sources in various types lighting fixtures, such as, for example, lighting fixtures configured for theatrical illumination and other types of entertainment lighting applications. However, such lighting fixtures may suffer from one or more drawbacks. For example, the LED lighting fixtures may employ LEDs of multiple colors and may be unable to obtain efficient mixing of the colors. Thus, Applicants have recognized a need to provide a LED-based lighting unit that utilizes an optical component to satisfactorily mix light output from a plurality of LEDs. The optical component may optionally be located below a reflector and/or other additional light altering structure. In some embodiments, the optical component may include at least one reflective surface interiorly thereof and the LEDs may be vertically arranged about the reflective surface. The reflective surface may, in some embodiments, include a conical optical member or may include a plurality of reflective pyramidal structures. More generally, Applicants have recognized and appreciated that it would be beneficial to provide satisfactory mixing of light output from a plurality of LEDs of a lighting unit, thereby providing satisfactory minimization of chromatic aberration in a light output produced by the lighting unit. In view of the foregoing, various embodiments and implementations of the present invention are directed to a LED-based lighting unit.

Figure 1:
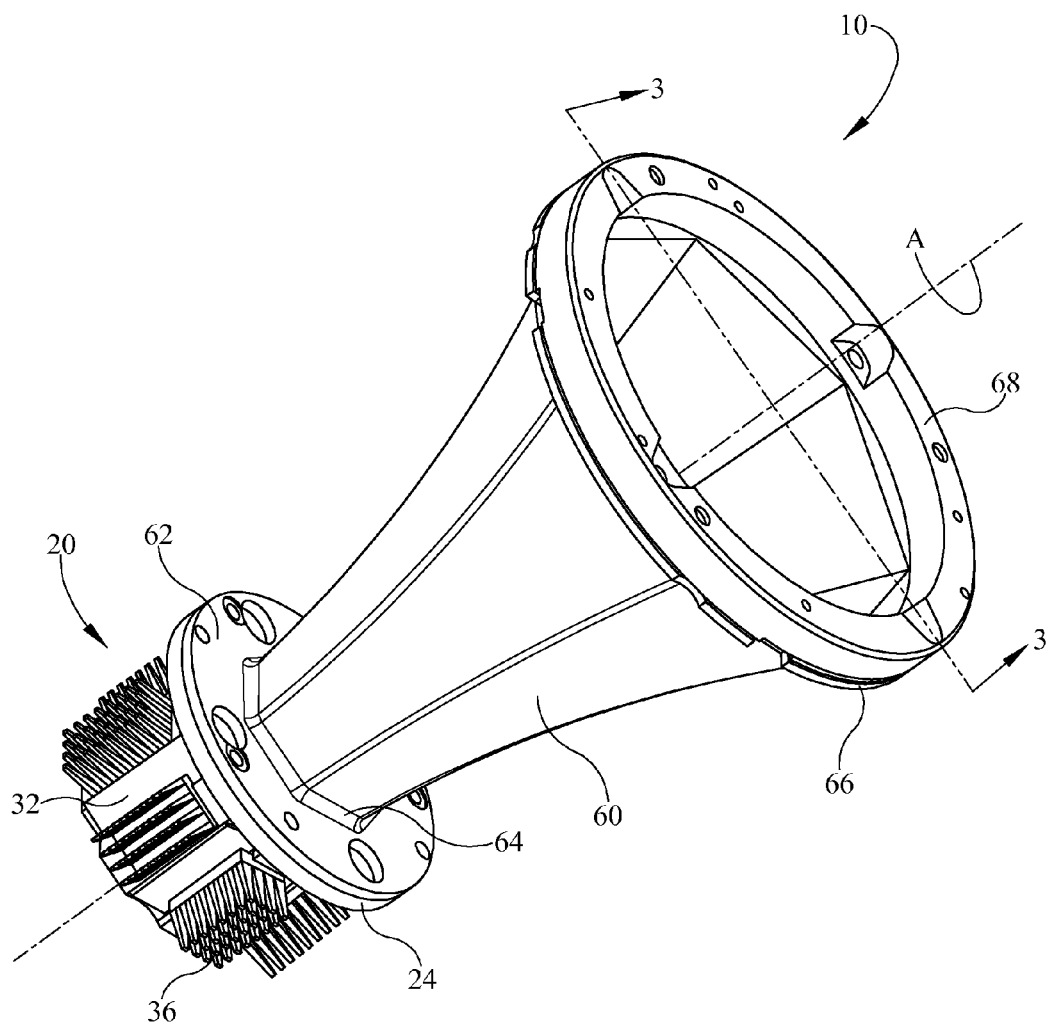
FIG. 1 illustrates a perspective view of a first embodiment of a LED-based lighting unit.
Figure 2:
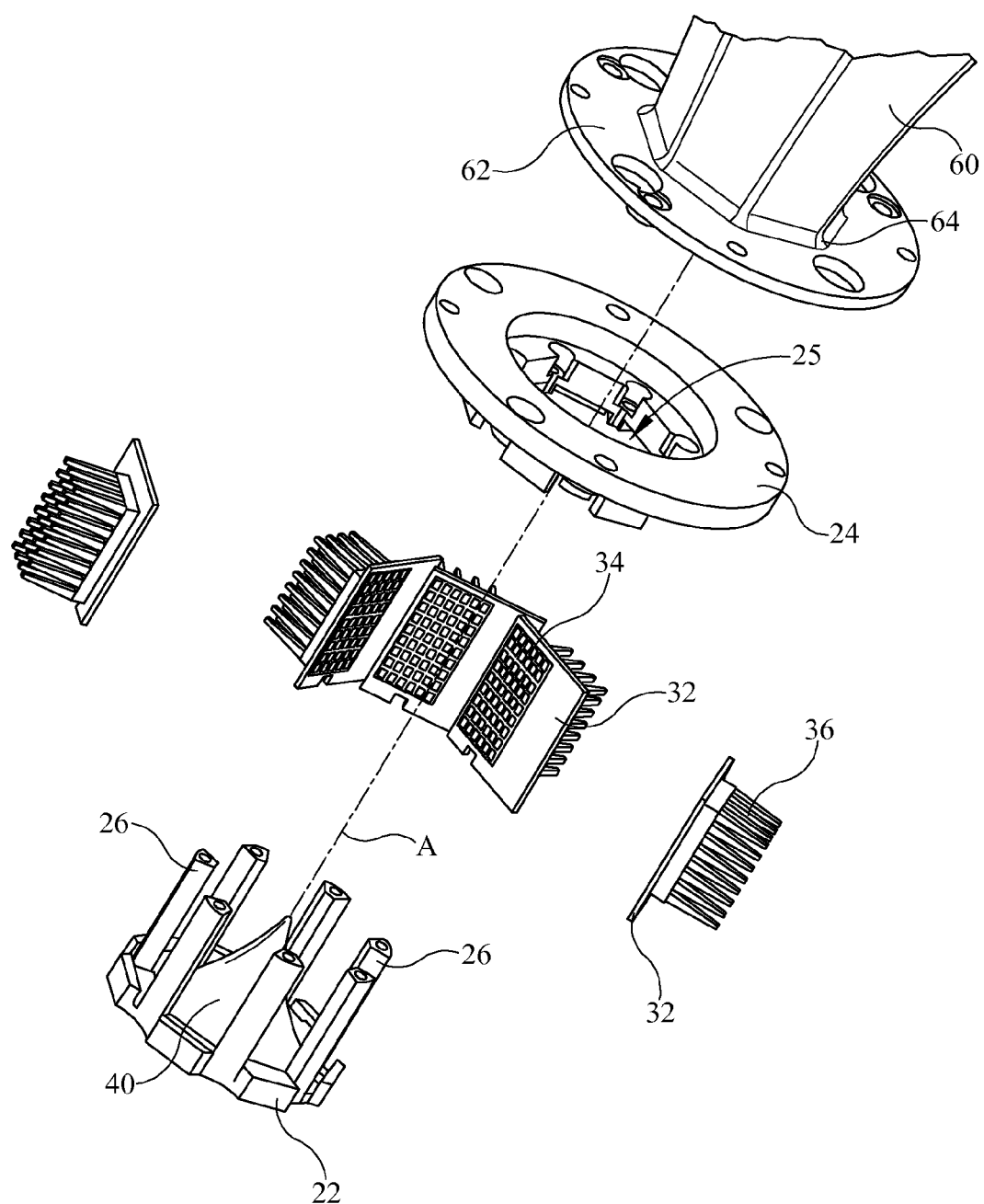
FIG. 2 illustrates an exploded perspective view of portions of the LED-based lighting unit of FIG. 1, including an optical component thereof; two of the seven LED PCBs are not illustrated in FIG. 2 for ease in viewing other components.
Figure 3:
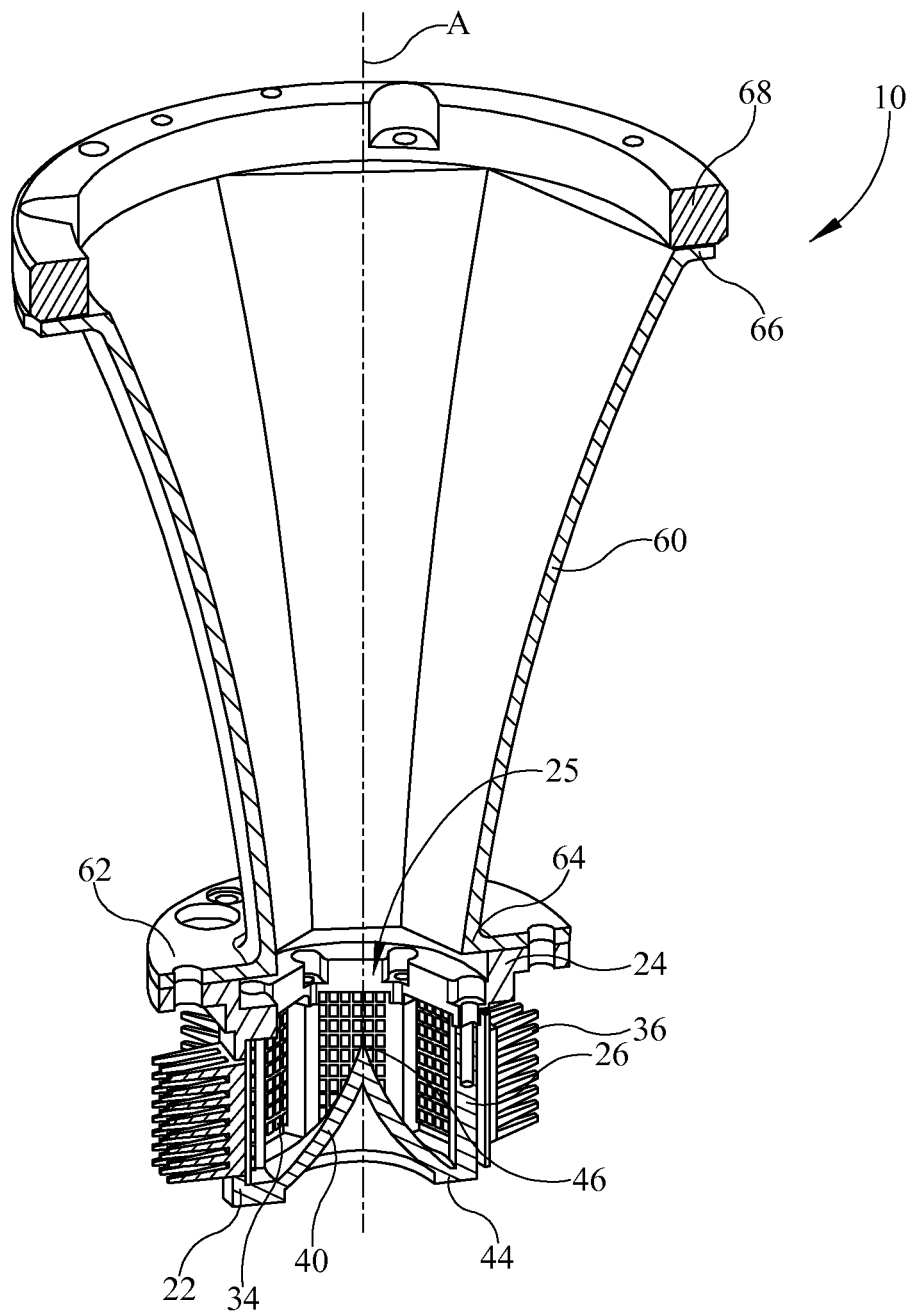
FIG. 3 illustrates a section view of the LED-based lighting unit of FIG. 1 taken along the section line 3-3 of FIG. 1.

Referring to FIGS. 1 through 3, in one embodiment, a LED-based lighting unit 10 includes a single horn-type reflector 60 placed over an LED optical component 20. The reflector 60 is substantially centered about a longitudinally extending central lighting unit axis A. The reflector 60 includes a reflector base 64 that flares upward and outward toward a reflector top 66. The reflector top 66 generally defines a light output opening of the LED-based lighting unit 10. The reflector 60 includes seven separate interior flared faces. A reflector support flange 62 extends radially from the reflector base 64 and is coupled to an upper support 24 of the optical component 20. For example, fasteners may extend through openings in the support flange 62 and be received in corresponding openings of upper support 24. In alternative embodiments support flange 62 and upper support 24 may be adhesively coupled to one another, welded to one another, commonly formed, and/or one of the two may be omitted. For example, in some embodiments reflector base 64 may be directly attached to the upper support 24. The reflector support flange 62 includes a plurality of fastener openings therethrough that may receive fasteners therethrough for attachment of the reflector 60 to the optical component 20. The reflector top 66 is provided with an upper flange 68 therearound. The upper flange 68 may interface with a housing when the LED-based lighting unit 10 is implemented in a lighting fixture and may optionally include a gasket.

The depicted reflector 60 is an asymmetric horn-type reflector. In other embodiments, other reflectors may be utilized. For example, in some alternative embodiments a symmetric horn-type reflector may be utilized. In other embodiments no reflector or a non-horn-type reflector may optionally be utilized. In the depicted LED-based lighting unit there is no diffuser or other light altering lens present between the upper flange 68 and the reflector base 64. In alternative embodiments a diffuser may optionally be added along the reflector 60 and/or may be included beyond the reflector 60 over or before a light output opening of a lighting fixture within which the LED-based lighting unit 10 is implemented. For example, a diffuser may optionally be added across the reflector top 66. In some embodiments the reflector 60 and any housing within which the LED-based lighting unit 10 is installed may be free of light altering lenses that substantially interfere with light output of the LED-based lighting unit 10. In some of those embodiments reflector 60 and/or other aspects of the lighting fixture may optionally be provided with a protective non-light-altering lens.

The upper support 24 generally defines an optical component light output opening 25 that is in optical communication with a corresponding light input opening at reflector base 64. Each of the aforementioned light output openings are substantially centered about the lighting unit axis A in the illustrated embodiment. In some embodiments a diffuser or other light altering lens may optionally be added in the optical component 20. For example, in some embodiments a holographic diffuser may optionally be added across the optical component light output opening 25.

The upper support 24 may be affixed to lower support 22 via vertically extending support columns 26 extending therebetween. The upper support 24 and/or the lower support 22 may be affixed to the support columns 26 utilizing, for example, one or more of screws or other fasteners, adhesive, interference fit, and/or welding. In some embodiments the upper support 24, columns 26, and/or lower support 22 may be formed as a cohesive piece. For example, in some embodiments the support columns 26 and the lower support 22 may be formed as a cohesive piece. The vertically extending support columns 26 are arranged substantially parallel to, and centered about, the lighting unit axis A in the illustrated embodiment.

Extending upward from the lower support 22 is a conical optical member 40 having a conical optical member base 44 and an optical member apex 46. The conical optical member 40 is substantially centered about the lighting unit axis A in the illustrated embodiment, the apex 46 is aligned therewith, and the conical optical member 40 is substantially symmetrical thereabout. The conical optical member 40 has an exterior surface that is concave as viewed from the exterior. The exterior surface is reflective. In some embodiments the exterior surface may include a silver metalized vacuum deposited coating thereon. In some embodiments the exterior surface may have a cross-section that is generally parabolic on each side of the lighting unit axis A. As described herein, all or portions of the exterior surface may be configured to redirect a majority of light output emitted by LED arrays 34 and incident thereon upwardly toward and through the optical member light output opening 25 and the light opening at the reflector base 64.

The depicted optical member apex 46 extends upward to a location that is approximately two thirds of the distance to the optical member opening 25 from the optical member base 44 along the lighting unit axis A. In alternative embodiments the optical member apex 46 may optionally extend further or may not extend as far. Also, in alternative embodiments the optical member apex 46 may optionally be non-aligned with the lighting unit axis A and/or the conical optical member 40 may be non-symmetrical about the lighting unit axis A. One of ordinary skill in the art, having had the benefit of the present disclosure, will recognize and appreciate that an optical member may be configured according to the teachings hereof to achieve a desired level of color mixing, a desired optical output, and/or to interface with a particular reflector or other optical component provided in addition to or in lieu of a reflector atop the optical component 20. For example, in some embodiments a non-symmetrical optical member may be utilized to achieve a non-symmetric light output from a lighting unit.

Surrounding the conical optical member 40 are seven LED PCBs 32 each including a LED array 34 thereon and a heatsink 36 extending rearward therefrom. The LED arrays 34 surround and are generally directed toward the optical member 40 and the lighting unit axis A. The LED arrays 34 are each generally parallel to the lighting unit axis A and the central axis (an axis emanating from each LED generally perpendicular to the corresponding LED PCB 32) of each LED of the LED arrays 34 is generally perpendicular to the lighting unit axis A. The LED arrays 34 each extend vertically between a pair of support columns 26. In some embodiments the LED PCBs 32 may be attached to the support columns 26. For example, in some embodiments the LED PCBs 32 may be slidably received in grooves of the support columns 26. Also, for example, in some embodiments the LED PCBs 32 may additionally or alternatively be adhesively coupled to the support columns 26 and/or affixed utilizing one or more fasteners. The LED arrays 34 are generally vertically arranged and centered about the conical optical member 40.

In some embodiments, at least the interior facing surfaces of the LED PCBs 32, the support columns 26, and/or the supports 22/24 may be reflective. For example, in some embodiments the LED PCBs 32, the support columns 26, and/or the supports 22/24 may be formed of a reflective material. Also, for example, in some embodiments the surfaces of the LED PCBs 32 and/or the support columns 26 may additionally or alternatively include silver metalized vacuum deposited coating thereon. In some embodiments the LED arrays 34 collectively include 385 LEDs divided up equally among the LED PCBs 32. In some versions of those embodiments the LED arrays 34 are multi-colored and produce approximately 20K lumens at 500 W. The multi-colored LED arrays may include three or more separate channels in some embodiments. Although seven separate LED arrays 34 are illustrated interfacing with a horn-type reflector 60 having seven different flared faces, in alternative embodiments, more or fewer LED arrays 34 may be provided, the number of which may or may not correspond to the number of faces that may be present on any reflector. In some particular embodiments, it may be desirable to provide an odd number of LED arrays 34 in an asymmetric manner.

In the illustrated embodiment of FIGS. 1-3, some of the LED light output emitted from the LED arrays 34 is incident directly upon the conical optical member 40. Some of such light directly incident on the conical optical member 40 is reflected upwardly thereby toward and through the optical component light output opening 25. Other light directly incident on the conical optical member 40 may be farther reflected internally of optical component 20 (optionally one or more additional times by conical optical member 40) prior to being directed through the optical component light output opening 25. Other LED light output emitted from the LED arrays 34 may be indirectly incident upon conical optical member 40 and then directly or indirectly directed through light output opening 25. Yet other LED light output emitted from the LED arrays 34 may be reflected solely off other surfaces interior of optical component 20 prior to being directed out of light output opening 25. Yet other minimal amount of LED light output emitted from the LED arrays 34 may be directed directly out of light output opening 25. The collective light output mixing achieved by the optical component 20 provides for satisfactory mixing of LED light output prior to such output entering the reflector 60.

In alternative embodiments, other heat dissipating structure may optionally be included in addition to or in lieu of the heatsinks 36. For example, in some embodiments, heat pipes, thermal micro channel materials (e.g., graphite and/or IsoSkin), and/or water pumped systems may be utilized to move heat from the individual PCBs 32 to a single fin stack. One or more fans may optionally be provided to blow air across the fin stack. Also, for example, in some embodiments heat pipes, thermal micro channel materials, and/or water pumped systems may be utilized to move heat from each individual PCB 32 to one of a plurality of fin stacks associated only with only a single PCB 32. One or more fans may optionally be provided, each blowing air across one or more fin stacks.

In some embodiments, the LED-based lighting unit 10 may optionally be implemented in an entertainment lighting fixture such as, for example a stage lighting fixture. However, one of ordinary skill in the art, having had the benefit of the present disclosure, will recognize and appreciate that in alternative embodiments LED-lighting units according to the teachings hereof may be implemented in other LED-based lighting fixtures such as, for example, spot accent lighting fixtures and/or architectural lighting fixtures.

Figure 4:
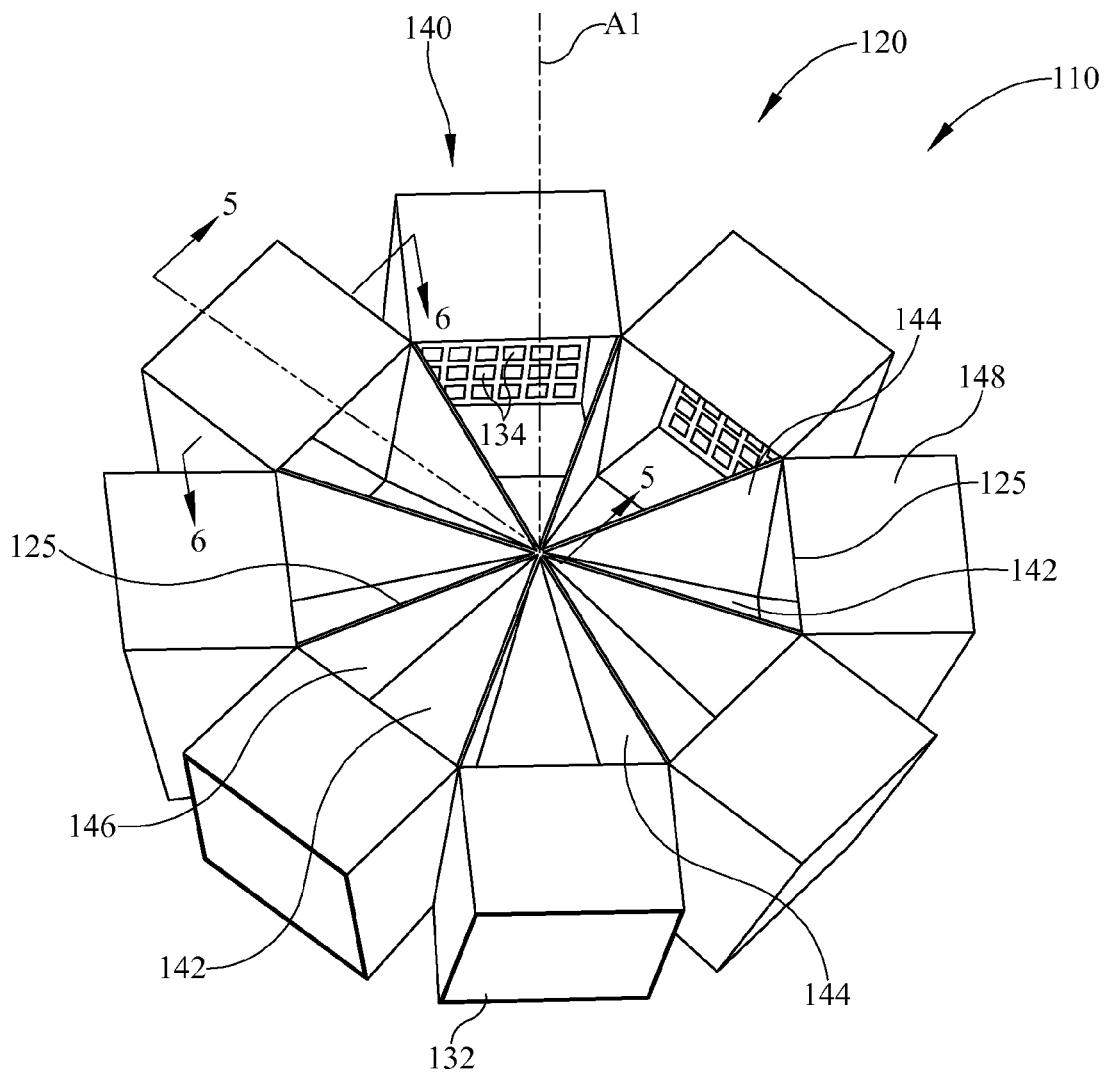
FIG. 4 illustrates a second embodiment of an LED-based lighting unit.
Figure 5:
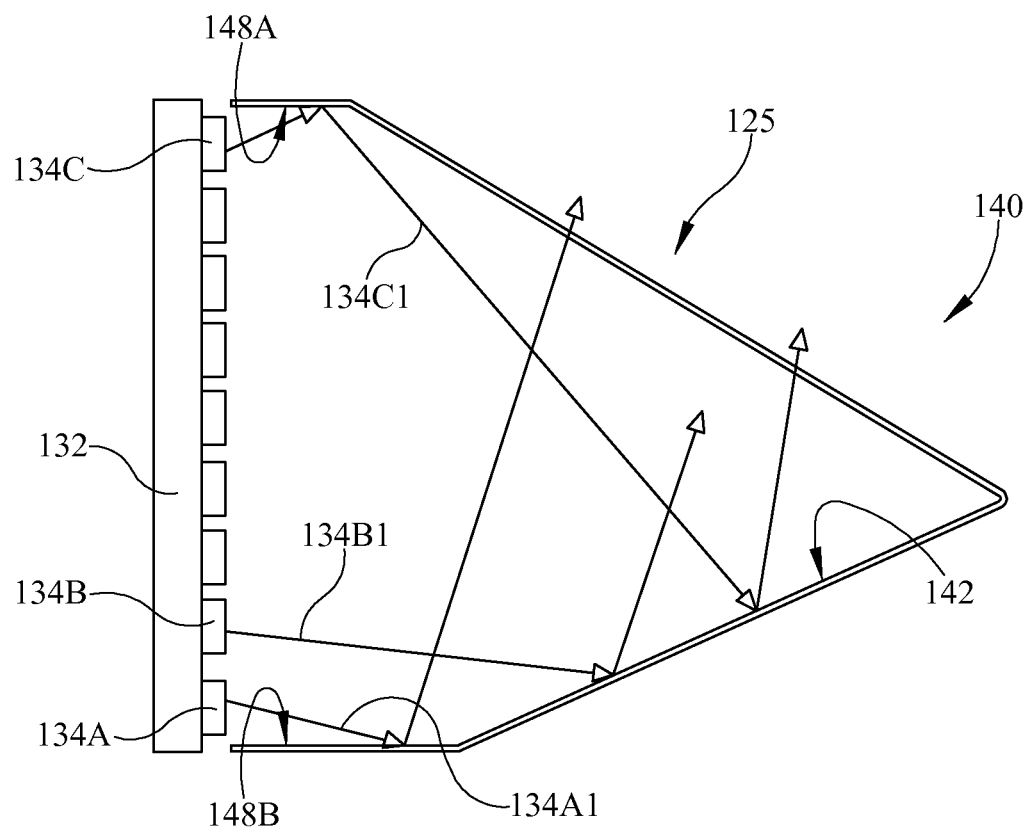
FIG. 5 illustrates a section view of the LED-based lighting unit taken along the section line 5-5 of FIG. 4; exemplary light rays are also depicted extending from a plurality of LEDs of one of the LED PCBs of the LED-based lighting unit.
Figure 6:
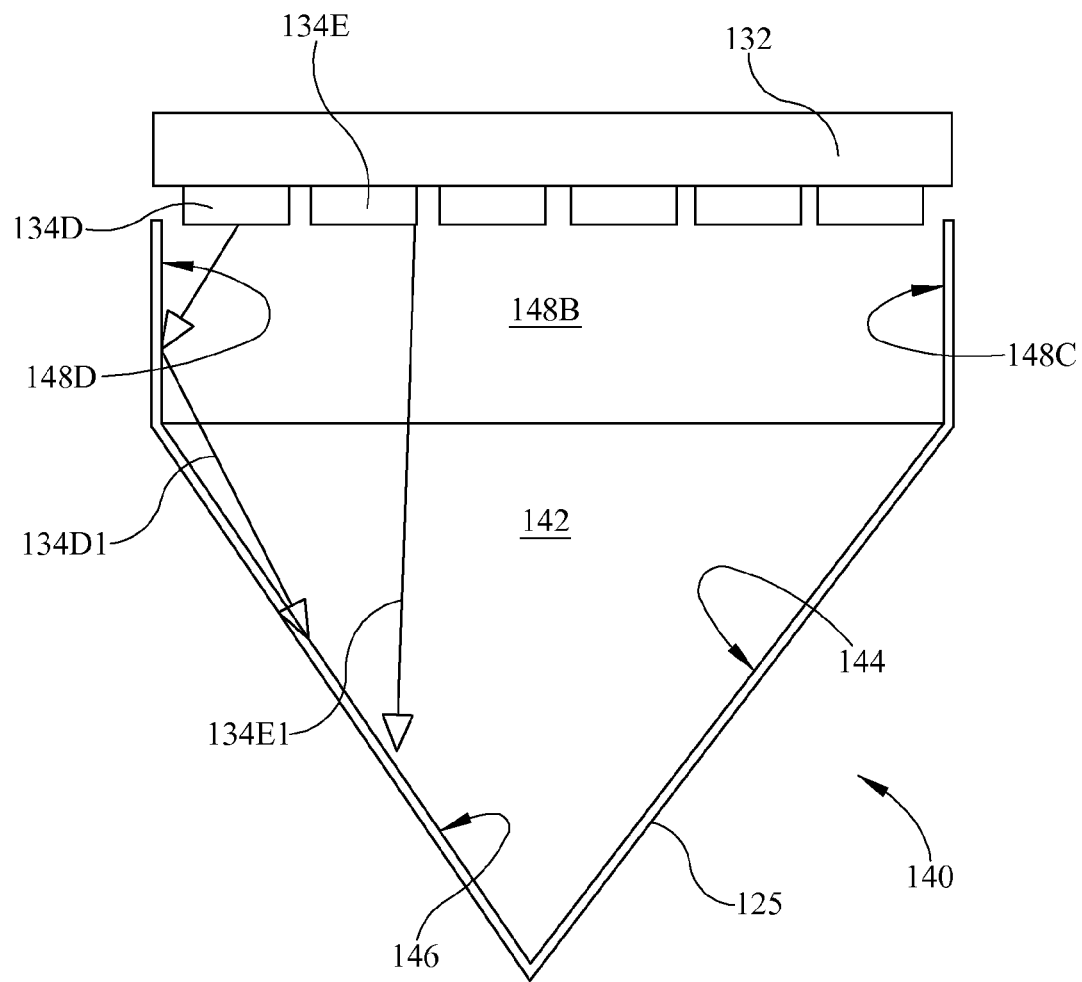
FIG. 6 illustrates a section view of the LED-based lighting unit taken along the section line 6-6 of FIG. 4; exemplary light rays are also depicted extending from a plurality of the LEDs of one of the LED PCBs.

Referring to FIGS. 4-6, a second embodiment of an LED-based lighting unit 100 is illustrated. The lighting unit 110 includes an optical component 120 and a plurality of LED PCBs 132. The lighting unit 110 includes a plurality of reflective pyramidal structures 140 arranged about a lighting unit axis A1 of the LED-based lighting unit 100. Each of the pyramidal structures 140 has substantially the same configuration. However, in other embodiments the size and/or shape of one or more of the pyramidal structures may vary. Moreover, in some embodiments more or fewer pyramidal structures may be provided. The pyramidal structures 140 are radially arranged about the lighting unit axis A1 with apexes 124 of each pyramidal structure being most closely adjacent the lighting unit axis A1. The LED PCBs 132 are centered about, and are substantially parallel with, the lighting unit axis A1.

The pyramidal structures 140 each include a planar triangular bottom reflective surface 142, a planar triangular first side reflective surface 144, and a planar triangular second side reflective surface 146. The reflective surfaces 142, 144, 146 are atop an elongated rectangular base 148. Each rectangular base 148 surrounds a single LED array 134 of one of the LED PCBs 132 and receives the light output from the LED array 134. Although the LED PCBs 132 are depicted as being toward the outermost portion of the rectangular bases 148, in alternative embodiments the LED PCBs 132 may be more fully received therein. Also, in some alternative embodiments the rectangular bases 148 may be omitted. The bottom reflective surfaces 142 all converge toward a central apex that is substantially aligned with the lighting unit axis A1 and that substantially corresponds with the apexes 124 of each of the individual pyramidal structures 140. Upper edges of the side surfaces 144 and 146 of each of the pyramidal structures 140 actually converge downward toward the central apex. However, the central apex constitutes an apex with respect to the bottom surfaces 142.

In some embodiments, at least the interior facing surfaces of the pyramidal structures 140 may be reflective. For example, in some embodiments the entirety of the pyramidal structures 140 may be formed of a reflective material. Also, for example, in some embodiments all surfaces of the pyramidal structures 140 may additionally or alternatively include silver metalized vacuum deposited coating thereon.

An optical component light output opening is collectively formed by the plurality of individual openings 125 in the open side of each of the pyramidal structures 140. A reflector, lens, or other optical component may optionally be provided atop and in optical communication with the light output opening formed by the plurality of individual openings 125 and/or one or more of the individual openings 125. For example, in some embodiments a horn-type reflector may be provided atop the light output opening and be substantially centered about the longitudinal lighting axis A1. The horn-type reflector may include a single opening in optical communication with the light output opening formed by the plurality of individual openings 125.

Referring to FIGS. 5 and 6, section views of the optical component taken along the section lines 5-5 and 6-6 of FIG. 4, respectively, are illustrated. Exemplary light rays are also depicted extending from a plurality of the LEDs 134A-D of one of the LED arrays 134 of the LED PCBs 132. It is understood that many other light rays will emanate from each of the LEDs of the LED array 134.

In FIG. 5 light ray 134C1 is directed from LED 134C to a top interior surface of rectangular base 148, then reflected to bottom surface 142, which in turn reflects light ray 134C1 through light output opening 125. Light ray 134B1 is directed from LED 134B to bottom surface 142, then reflected through light output opening 125. Light ray 134A1 is directed from LED 134A to a bottom interior surface of rectangular base 148, then reflected through light output opening 125.

In FIG. 6 light ray 134D1 is directed from LED 134D to a side interior surface 148D of rectangular base 148D then directed through light output opening 125 toward apex 124. Light ray 134E1 is directed from LED 134E directly through light output opening 125. Depending on the exact exit angle of the light rays 134D1 and 134E1, one or both may optionally exit light output opening 125 of the pyramidal structure 140 illustrated in FIGS. 5 and 6 then enter the light output opening 125 of one or more other pyramidal structures 140, wherein they may be farther reflected one or more additional times prior to exiting light output opening(s) 125 thereof. Additional light rays will be emitted from each of the LEDs, a majority of which will be reflected one or more times by one or more pyramidal structures 140. The collective light output mixing achieved by the optical component 120 provides for satisfactory mixing of LED light output prior to such output finally exiting the optical component 120.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims in parentheses, if any, are provided merely for convenience and should not viewed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. An LED-based lighting unit, comprising:
   a longitudinally extending lighting unit axis;
   a light output opening surrounding said lighting unit axis;
   a reflector positioned above said light output opening and surrounding said lighting unit axis;
   a plurality of LEDs positioned below said light output opening and surrounding said lighting unit axis, each of said LEDs emitting a light output having a light output central axis generally directed toward and perpendicular to said lighting unit axis;
   at least one reflective surface interposed between at least some of said LEDs and said lighting unit axis;
   wherein said reflective surface is positioned such that a plurality of said light output central axis are directly incident thereon; and
   wherein said reflective surface is configured such that a plurality of said light output central axis directly incident thereon are directed through said light output opening.

2. The LED-based lighting unit of claim 1, wherein said reflective surface is a reflective conical optical member having an apex most closely adjacent said light output opening.

3. The LED-based lighting unit of claim 2, wherein said apex is centered on said lighting unit axis.

4. The LED-based lighting unit of claim 1, wherein said reflective surface includes a plurality of planar surfaces converging toward an apex.

5. The LED-based lighting unit of claim 4, wherein said apex is centered on said lighting unit axis.

6. The LED-based lighting unit of claim 1, wherein said LEDs are arranged on a plurality of planar mounting surfaces centered about said lighting unit axis.

7. The LED-based lighting unit of claim 1, wherein said reflective surface includes a plurality of pyramidal structures radially arranged about said lighting unit axis and each having an apex most closely adjacent said lighting unit axis.

8. An LED-based lighting unit, comprising:
   a longitudinally extending lighting unit axis;
   a light output opening surrounding said lighting unit axis;
   a light altering structure positioned above said light output opening and centered about said lighting unit axis;
   a plurality of LED PCBs positioned below said light output opening and surrounding said lighting unit axis, each of said LED PCBs being substantially parallel to said lighting unit axis and having interiorly facing LEDs thereon emitting a light output having a light output central axis; and
   a reflective conical optical member provided interiorly of said LED PCBs and centered about said lighting unit axis, said conical optical member having a base and an apex, said apex being more proximal said light output opening than said base.

9. The LED-based lighting unit of claim 8, wherein an exterior surface of said conical optical member between said base and said apex is generally concave.

10. The LED-based lighting unit of claim 8, further comprising a plurality of support structures interposed between said LED PCBs.

11. The LED-based lighting unit of claim 10, wherein at least an interior facing portion of each of said support structures is reflective.

12. The LED-based lighting unit of claim 8, wherein at least an interior facing portion of each of said LED PCBs is reflective.

13. The LED-based lighting unit of claim 8, wherein the distance along said lighting unit axis between said base and said apex is greater than the distance along said lighting unit axis between said apex and said light output opening.

14. The LED-based lighting unit of claim 8, wherein an odd number of said LED PCBs are asymmetrically arranged about said lighting unit axis.

15. The LED-based lighting unit of claim 8, wherein said light altering structure is a reflector.

16. An LED-based lighting unit, comprising:
a longitudinally extending lighting unit axis;
a light output opening surrounding said lighting unit axis;
a plurality of LED PCBs positioned below said light output opening and surrounding said lighting unit axis, each of said LED PCBs being substantially parallel to said lighting unit axis and having interiorly facing LEDs thereon emitting a light output having a light output central axis; and
a plurality of reflective pyramidal structures provided interiorly of said LED PCBs and radially arranged about said lighting unit axis, each of said pyramidal structures having an apex most proximal said lighting unit axis and a base most distal said lighting unit axis, said base receiving a majority of said light output from a single of said LED PCBs.

17. The LED-based lighting unit of claim 16, wherein an odd number of said pyramidal structures are provided.

18. The LED-based lighting unit of claim 16, wherein said pyramidal structures are each non-symmetrical.

19. The LED-based lighting unit of claim 16, wherein said pyramidal structures each include an elongated rectangular base.

20. The LED-based lighting unit of claim 16, further comprising a horn-type reflector positioned above said light output opening and surrounding said lighting unit axis.

21. The LED-based lighting unit of claim 18, wherein said pyramidal structures each include a bottom surface and side surfaces with upper edges that converge downward towards an apex of the bottom surface.

22. The LED-based lighting unit of claim 16, wherein said pyramidal structures include bottom reflective surfaces that all converge towards the lighting unit axis.

23. The LED-based lighting unit of claim 16, wherein interior surfaces of the pyramidal structures are coated with silver metalized vacuum deposited coating.

24. The LED-based lighting unit of claim 19, wherein the plurality of LED PCBs are positioned within the rectangular bases towards their outermost portions.

* * * * *